(12) United States Patent
Shen et al.

(10) Patent No.: US 10,948,604 B2
(45) Date of Patent: Mar. 16, 2021

(54) HIGH-PRECISION REAL-TIME SATELLITE POSITIONING METHOD

(71) Applicant: BROADGNSS TECHNOLOGIES CO., LTD., Shenzhen (CN)

(72) Inventors: Yan Shen, Tianjin (CN); Yuanbo Li, Luoyang (CN)

(73) Assignee: BROADGNSS TECHNOLOGIES CO., LTD., Shenzhen (CN)

( * ) Notice: Subject to any disclaimer, the term of this patent is extended or adjusted under 35 U.S.C. 154(b) by 191 days.

(21) Appl. No.: 16/248,772

(22) Filed: Jan. 16, 2019

(65) Prior Publication Data

US 2019/0154841 A1    May 23, 2019

Related U.S. Application Data

(63) Continuation of application No. PCT/CN2017/096157, filed on Aug. 7, 2017.

(30) Foreign Application Priority Data

Sep. 14, 2016    (CN) .......................... 201610822102.0

(51) Int. Cl.
   *G01S 19/40*    (2010.01)
   *G01S 19/35*    (2010.01)

(52) U.S. Cl.
   CPC .............. *G01S 19/40* (2013.01); *G01S 19/35* (2013.01)

(58) Field of Classification Search
   CPC ................................. G01S 19/35; G01S 19/40
   See application file for complete search history.

(56) References Cited

U.S. PATENT DOCUMENTS

| 5,296,862 A | 3/1994 | Rodeffer et al. |
| 5,525,999 A * | 6/1996 | King ....................... G01S 19/07 342/357.62 |

(Continued)

FOREIGN PATENT DOCUMENTS

| CN | 105549048 A | 5/2016 |
| CN | 105589087 A | 5/2016 |

(Continued)

OTHER PUBLICATIONS

English Translation of JP 2000-329839 A (Year: 2020).*

(Continued)

*Primary Examiner* — Bernarr E Gregory
*Assistant Examiner* — Fred H Mull
(74) *Attorney, Agent, or Firm* — Bayes PLLC

(57) ABSTRACT

A high-precision real-time satellite positioning method comprises: establishing a polygonal satellite positioning receiver array comprising a plurality of satellite positioning receiving mechanisms; transmitting, by the satellite positioning receiving mechanisms, and to a processor module, respective IDs and observation coordinates; computing, by the processor module, a physical geometric pattern and an observation geometric pattern; comparing the physical geometric pattern and the observation geometric pattern to extract an offset vector caused by an error, and to generate an offset vector function library; and subtracting the offset vector from an observation value of a phase center of antennas of the satellite positioning receivers to obtain a corrected satellite positioning value. The embodiment can eliminate a positioning error present in satellite positioning receivers, increasing positioning precision significantly, having features such as a reasonable design, high precision, low costs, and being easy to use. The embodiment can be (Continued)

promoted to large-scale civil applications in high-precision real-time satellite positioning and navigation.

18 Claims, 3 Drawing Sheets

(56) References Cited

U.S. PATENT DOCUMENTS

| | | | | | |
|---|---|---|---|---|---|
| 5,572,218 | A | * | 11/1996 | Cohen | G01S 19/44 |
| | | | | | 342/357.42 |
| 8,120,527 | B2 | * | 2/2012 | Ashjaee | G01S 19/14 |
| | | | | | 342/357.27 |
| 2002/0016881 | A1 | * | 2/2002 | Hatsumoto | G01S 19/14 |
| | | | | | 710/305 |
| 2003/0107514 | A1 | * | 6/2003 | Syrjarinne | G01S 19/34 |
| | | | | | 342/357.74 |
| 2014/0012499 | A1 | * | 1/2014 | Hirose | G01C 21/165 |
| | | | | | 701/470 |
| 2016/0033648 | A1 | * | 2/2016 | Overbeck | G01S 19/42 |
| | | | | | 342/357.25 |
| 2017/0254901 | A1 | * | 9/2017 | Kim | G01S 19/22 |
| 2018/0239028 | A1 | * | 8/2018 | Ibendorf | G01S 19/36 |

FOREIGN PATENT DOCUMENTS

| | | | |
|---|---|---|---|
| CN | 105699939 | A | 6/2016 |
| CN | 205374750 | U | 7/2016 |
| CN | 205374753 | U | 7/2016 |
| CN | 106501826 | A | 3/2017 |
| JP | 2000329839 | A * | 11/2000 |

OTHER PUBLICATIONS

SIPO International Search Report of the International Search Authority issued in International Application No. PCT/CN2017/096157, dated Oct. 10, 2017, 4 pages, with English translation.

SIPO Written Opinion of the International Search Authority issued in International Application No. PCT/CN2017/096157, dated Oct. 10, 2017, 3 pages.

* cited by examiner

HIGH-PRECISION REAL-TIME SATELLITE POSITIONING METHOD

CROSS REFERENCE TO RELATED APPLICATION

This application is continuation of International Application No. PCT/CN2017/096157, filed on Aug. 7, 2017, entitled "HIGH-PRECISION REAL-TIME SATELLITE POSITIONING METHOD," which claims priority to Chinese Application No. 201610822102.0, filed on Sep. 14, 2016, both of which are hereby incorporated by reference in their entireties.

TECHNICAL FIELD

The present invention relates to the field of satellite navigation and positioning technologies, and in particular, to a high-precision real-time satellite positioning method.

BACKGROUND

A satellite positioning and navigation system mainly includes GPS, Beidou, GLONASS, Galileo and the like. With the rapid development of satellite positioning technologies, the demand of people for the rapid and high-precision position information is daily increased. At present, the application range of the high-precision real-time satellite positioning and navigation becomes wider and wider, and the positioning precision of a user receiver is required to reach a decimeter scale and even a centimeter scale.

The technology of satellite positioning receiver has already been very mature. It can be known from a known principle that satellite positioning is realized by utilizing observations (such as pseudo-ranges, ephemeris, and launching time of a group of satellites) and a user clock difference. At least four satellites must be measured to obtain a three-dimensional coordinate on the ground. In this positioning process, three parts of errors exist: a first part of errors is caused by a satellite clock error, an ephemeris error, an ionosphere error, a troposphere error and the like; a second part of errors is an error caused by propagation delay; and a third part of errors is an inherent error of a user receiver which is caused by internal noise, channel delay, multi-path effect and the like. Due to the existence of these errors, it is very difficult for the positioning precision of an ordinary satellite positioning receiver to reach less than 10 m, and thus it is difficult to meet a high-precision positioning requirement.

SUMMARY

It is an object of the present invention to overcome the shortage of the prior art and provide a high-precision real-time satellite positioning method, thereby solving the problem of positioning precision of a satellite positioning receiver.

The present invention solves the technical problem by the following technical solutions:

A high-precision real-time satellite positioning method, comprising:

Step 1: establishing a polygonal satellite positioning receiver array including a plurality of satellite positioning receivers, where each satellite positioning receiver comprises an MCU and a receiver connected to the MCU, and the MCUs of the plurality of satellite positioning receivers are connected in parallel with each other and jointly connected to a processor module;

Step 2: sending, by each satellite positioning receiver, its ID and observed coordinate value to the processor module;

Step 3: calculating according to the ID of each satellite positioning receiver, the observed coordinate value of each satellite positioning receiver and a physical geometric parameter of the polygonal receiver array, by the processor module, two geometries including: a physical geometry with vertexes being antenna phase centers of the plurality of satellite positioning receivers; and an observed value geometry with vertexes defined by the observed coordinate value of the plurality of satellite positioning receivers;

Step 4: comparing the physical geometry with the observed value geometry, calculating a vector of a relative position among the observed coordinate values of the antenna phase centers of the plurality of satellite positioning receivers, comparing the vector with a known vector of a relative position among the antenna phase centers of the plurality of satellite positioning receivers, and extracting a deviation vector caused by an error and forming a deviation vector function library; and Step 5: obtaining a corrected satellite positioning value by subtracting the deviation vector from the observed value of the antenna phase center of each satellite positioning receiver.

The Step 2, Step 3, Step 4 and Step 5 are repeated, and the deviation vector is gradually decreased, so that a high-precision satellite positioning value is obtained.

The polygonal satellite positioning receiver array is a triangular, quadrangular, pentagonal or hexagonal satellite positioning receiver array, and the antenna oscillators of the satellite positioning receivers are distributed on the same plane.

The polygonal satellite positioning receiver array is formed by connecting each vertex satellite receiver.

The polygonal satellite positioning receiver array is formed by connecting one or more satellite positioning receivers in a region surrounded by each vertex satellite positioning receiver and each vertex satellite positioning receiver.

The two geometries obtained in the Step 3 include: a physical geometry with vertexes being the antenna phase center of each of the vertex satellite positioning receivers; and an observed value geometry with vertexes defined by the observed value of each of the vertex satellite positioning receivers.

The two geometries obtained in the Step 3 include: a physical geometry with vertexes being the antenna phase centers of the plurality of vertex satellite positioning receivers and the antenna phase center of one or more satellite positioning receivers in a region surrounded by the vertex satellite positioning receivers; and an observed value geometry with vertexes defined by the observed value of each of the vertex satellite positioning receivers and the observed value of one or more satellite positioning receivers in a region surrounded by the vertex satellite positioning receivers.

The process of comparing the physical geometry with the observed value geometry in the Step 4 comprises: comparing the length of a side of the physical geometry and that of the corresponding side of the observed value geometry, and comparing an included angle between two sides of the physical geometry and that of the corresponding included angle of the observed value geometry.

The invention has the following advantages and positive effects:

1) In the invention, a receiver array circuit is formed by arranging a plurality of satellite positioning receivers in a certain geometry, and a high-precision real-time satellite positioning software is run on a processor module, so that three parts of errors existing in an ordinary satellite positioning receiver can be eliminated to the maximum extent, and the positioning precision can be significantly increased (to decimeter or even centimeter scale) by directly using and processing a satellite positioning signal sent by a satellite positioning system; and 2) The invention provides a reasonable design and has the features of high precision, low cost and being easy to use, etc., and it may be widely applied in the ordinary civilian areas of high-precision real-time satellite positioning and navigation.

DETAILED DESCRIPTION

The embodiments of the invention will be further described in detail below in conjunction with the drawings.

In the invention, a high-precision real-time satellite positioning apparatus is constituted of a plurality of satellite positioning receivers arranged in a certain geometry, and a corresponding high-precision positioning algorithm is employed to improve the positioning precision. The antenna oscillators of the plurality of satellite positioning receivers are distributed on the same plane. The geometry formed by the antenna oscillators of the receiver array is a triangle, a quadrangle, a pentagon, a hexagon, or any other geometry. The antenna phase center of each satellite positioning receiver is located at each vertex and the center of the polygonal array (or located at other positions in a region surrounded by all vertex satellite positioning receivers).

Figure 2:
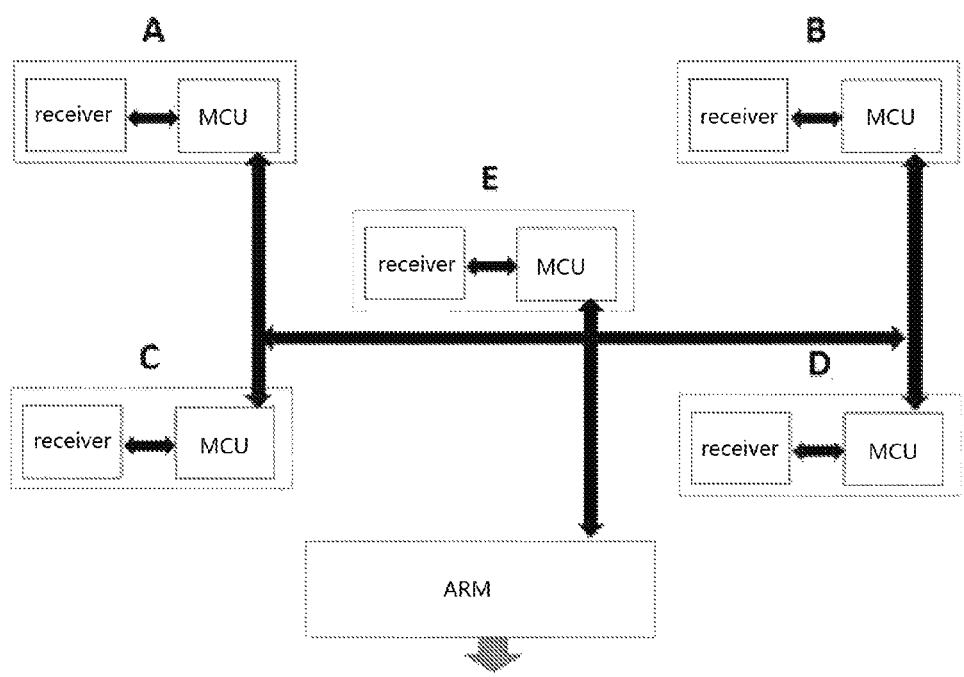
FIG. 2 is a circuit diagram of a quadrangular receiver array.

Illustration will be given below by an example in which a high-precision real-time satellite positioning apparatus is constituted of a quadrangular receiver array. The high-precision real-time satellite positioning apparatus including a quadrangular receiver array includes a general receiver circuit of a quadrangular array including five satellite positioning receivers, where the respective antenna geometric phase center of four satellite positioning receivers is located at four vertexes A, B, C, D of the quadrangular, and the antenna geometric phase center of the other central satellite positioning receiver is located at center E. The antenna oscillators of the receivers are distributed on the same plane. As shown in FIG. 2 of the circuit of the high-precision real-time satellite positioning apparatus, each satellite positioning receiver includes an MCU and a receiver connected to the MCU; and the MCUs of the five satellite positioning receivers are connected in parallel and jointly connected into a processor module. Each of the satellite positioning receivers (A, B, C, D and E) analyzes the satellite signal intensity, a satellite elevation angle and included angle as well as the number of available satellites, so as to enable the five receivers to lock same available positioning satellites. The original satellite positioning data is received at a rate of N frames per second to be processed independently, so that the phase center coordinate of each receiver is calculated. Each receiver utilizes a corresponding MCU to process the received data; and the five MCUs generate IDs of the five receivers. The five MCUs are connected in parallel, so that the five receivers can keep the data synchronous and can send the ID data of each receiver to the processor module (for example, an ARM module). A first function of the processor module is to control the five receivers and MCUs to be synchronous in data; and a second function of the processor module is to parse the data received by the MCUs, comprehensively process the data so as to complete the calculation and calculate and output a final positioning coordinate.

A high-precision real-time satellite positioning apparatus formed by a triangular array, a pentagonal array, a hexagonal array or any other geometry is similar to the high-precision real-time satellite positioning apparatus formed by the quadrangular array and is not repeated herein.

The above high-precision real-time satellite positioning apparatus can completely eliminate a first part of errors of the satellite positioning receivers and can eliminate a majority of a second part and a third part of errors. In order to realize the best application effect, the following requirements should be met: (1) the respective positioning precision of each receiver should be improved as far as possible; (2) the receiver antenna array should be arranged in a polygonal shape such as a triangle, a rectangle (square), pentagon or hexagon. The antenna phase center of each receiver is disposed at each vertex and other nodes; (3) the clock of each receiver is kept synchronous, and each receiver independent of MCU is used for synchronizing the clocks; (4) each receiver receives the data from same satellites, and receives the original data of satellite positioning signals at a rate of N frames per second to process the original data independently.

The design principle of the present invention is as follows: since the antenna phase center of each satellite positioning receiver is disposed at each vertex and other nodes of the polygon, vectors (distance and direction) of relative positions among the antenna phase centers of the receivers can be fixed as known-parameters. Furthermore, each receiver can obtain a satellite positioning coordinate observation. Due to errors of each receiver, a deviation exists between the observed value and a real coordinate of the antenna phase center of each receiver. The vector of the relative position among the observed coordinate values of the antenna phase centers of the receivers is compared with the known vectors of the relative position among the antenna phase centers of the receivers, so that a deviation vector caused by various foregoing errors can be extracted. Then, the deviation vector can be subtracted from the observed value of an overall phase center of the receiver antenna array, thereby obtaining an observed coordinate of an overall circuit of the receiver array. Since the deviation can be eliminated, the observed coordinate is much closer to the real coordinate.

Figure 1:
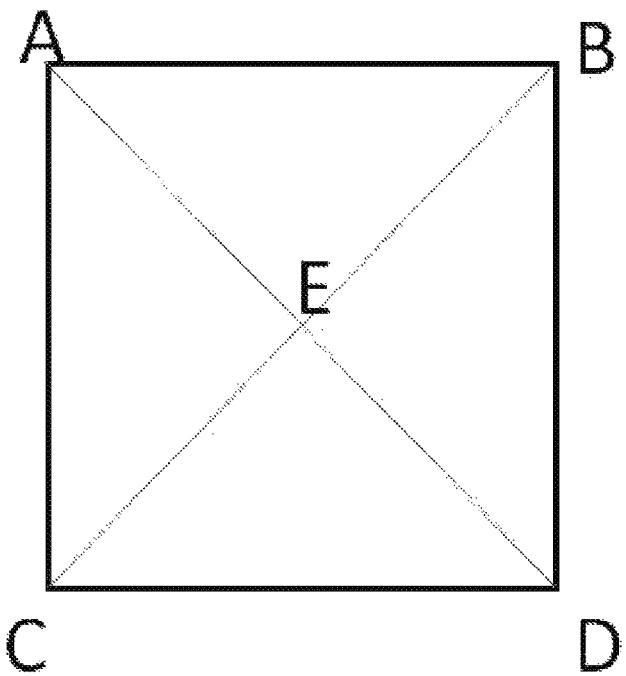
FIG. 1 is a geometric distribution diagram of a quadrangular receiver antenna array.

Based on the above high-precision real-time satellite positioning apparatus, a high-precision satellite positioning function may be realized by mounting a high-precision real-time satellite positioning software in the processor module (ARM). Illustration will be given below by taking a quadrangular receiver array as an example, and the high-precision real-time satellite positioning method according to the invention comprises the following steps:

Step 1: a polygonal satellite positioning receiver array including a plurality of satellite positioning receivers is established, as shown in FIG. 1 and FIG. 2;

Step 2: each satellite positioning receiver sends its ID and observed coordinate value to the processor module.

In this embodiment, the plurality of satellite positioning receivers include vertex satellite positioning receivers (A, B, C and D) and a central satellite positioning receiver (E).

Figure 3:
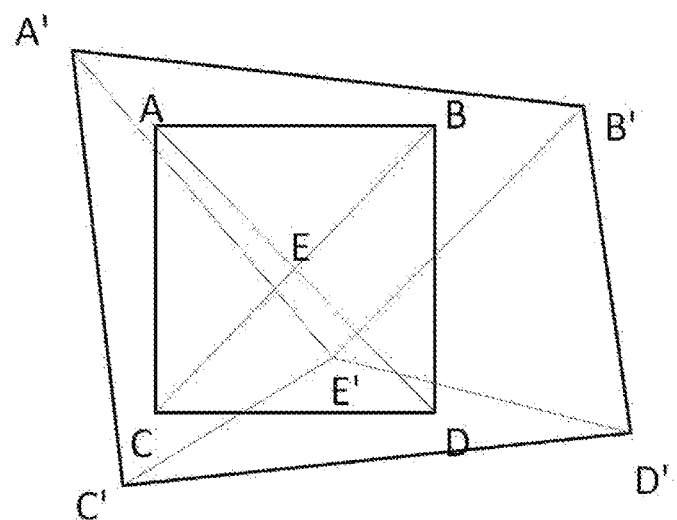
FIG. 3 is a schematic diagram showing the positioning of a quadrangular receiver array according to the invention.

Step 3: the processor module calculates the following two geometries according to the ID of each satellite positioning receiver, the observed value of each satellite positioning receiver and the physical geometric parameter of the quadrangular receiver array: one is a physical geometry ABCDE surrounded by the antenna phase centers of the four vertex satellite positioning receivers and the central receiver; the other is a geometry A'B'C'D'E' drawn by the observed values of the vertex satellite positioning receivers and the central receiver, as shown in FIG. 3;

Step 4: the geometry A'B'C'D'E' is compared with the geometry ABCDE, that is, the vector of a relative position among the observed coordinate values of the antenna phase centers of the receivers is compared with the known vector of a relative position among the antenna phase centers of each receivers. Thus, the deviation vector caused by the above mentioned various errors may be extracted, and a deviation vector function library may be formed. For example, the distance A'B' is compared the distance AB, the distance A'C' is compared with the distance AC, the included angle A is compared with the included angle A'; the distance D'B' is compared with the distance DB, the distance D'C' is compared with the distance DC, and the included angle D is compared with the included angle D'; the distance A'E' is compared with the distance AE, the distance B'E' is compared with the distance BE, and the included angle AEB is compared with the included angle A'E'B', etc.

Step 5: the deviation vector is subtracted from the observed value of the phase center of the receiver antenna, so that a corrected observed coordinate value is obtained.

In this step, the corrected observed coordinate value is obtained, and the deviation is eliminated, so that the corrected observed coordinate value is much closer to the real coordinate. Therefore, at this point, the vector of a relative position among the observed coordinate values of the antenna phase centers of the receivers will be much closer to the known vector of a relative position among the antenna phase centers of the receivers than that before correction.

The above steps may be repeated until the deviation vector approaches zero. At that point, the shape and size of ABCDE are the same as those of A'B'C'D'E', so that high-precision observed latitude and longitude coordinate information for the geometric center of the antenna array can be obtained.

In the invention, the high-precision real-time satellite positioning apparatus including the above polygonal receiver array may also be regarded as one satellite positioning receiver in FIG. 2 to form a new satellite positioning apparatus, and the above method may be employed to further increase the satellite positioning precision.

Figure 4:
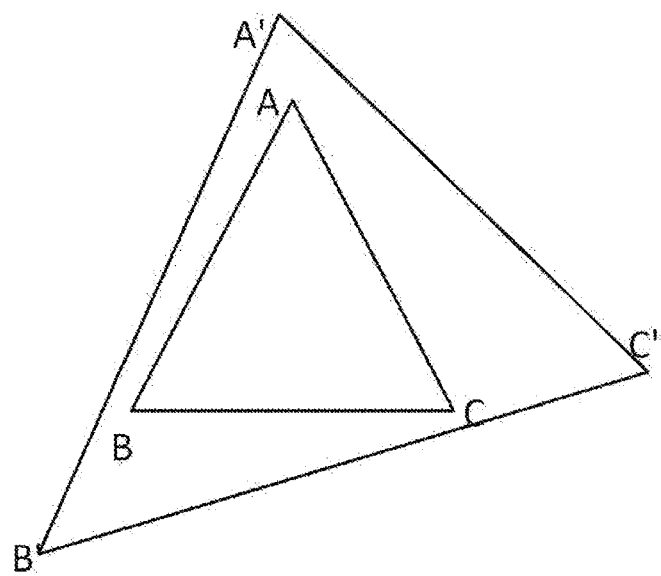
FIG. 4 is a schematic diagram showing the positioning of a triangular receiver array according to the invention.

Illustrations have been given above by taking a quadrangular receiver array as an example, and other polygonal receiver arrays may have similar processing manners. FIG. 4 shows a schematic diagram of a high-precision real-time satellite positioning method using a triangular array (in the triangular array shown, the satellite positioning receivers only comprise vertex satellite positioning receivers, without a central satellite positioning receiver). The physical geometry surrounded by three vertex satellite positioning receiver antenna phase centers is a triangle ABC. The geometry A'B'C' is drawn by the observed values at the vertex satellite positioning receivers. The triangular geometry A'B'C' is compared with the triangular geometry ABC. That is, the vector of a relative position among the observed coordinate values of the antenna phase centers of the receivers is compared with the known vector of a relative position among the antenna phase centers of the receivers. Thus, the deviation vector caused by the above-mentioned various errors may be extracted, and a deviation vector function library may be formed. For example, the distance A'B' is compared with the distance AB, the distance A'C' is compared with the distance AC, and the included angle A is compared with the included angle A'; the distance B'C' is compared with the distance BC, and the included angle B is compared with the included angle B'; and the included angle C is compared with the included angle C'. By designing the geometry of the receiver array and high-precision real-time satellite positioning software, the precision of the above extracted deviation vector may be increased. At this point, the deviation vector is subtracted from the observed value of the phase center of the receiver antenna, so that a corrected observed coordinate may be obtained. Because the deviation can be eliminated, the corrected coordinate is much closer to the real coordinate. Thus, at this point, the vector of a relative position among the observed coordinate values of the antenna phase centers of the receivers will be much closer to the known vector of a relative position among the antenna phase centers of the receivers than that before the correction. This process may be repeated until the deviation vector approaches zero. At this point, the shape and size of the triangular geometry ABC are the same as those of triangular geometry A'B'C'. At this point, high-precision observed latitude and longitude coordinate information of the geometric center of the antenna array may be obtained. The high-precision real-time satellite positioning apparatus including the above triangular array may be regarded as one receiver in FIG. 2, and higher satellite positioning precision may be further obtained by using the above apparatus and method.

Figure 5:
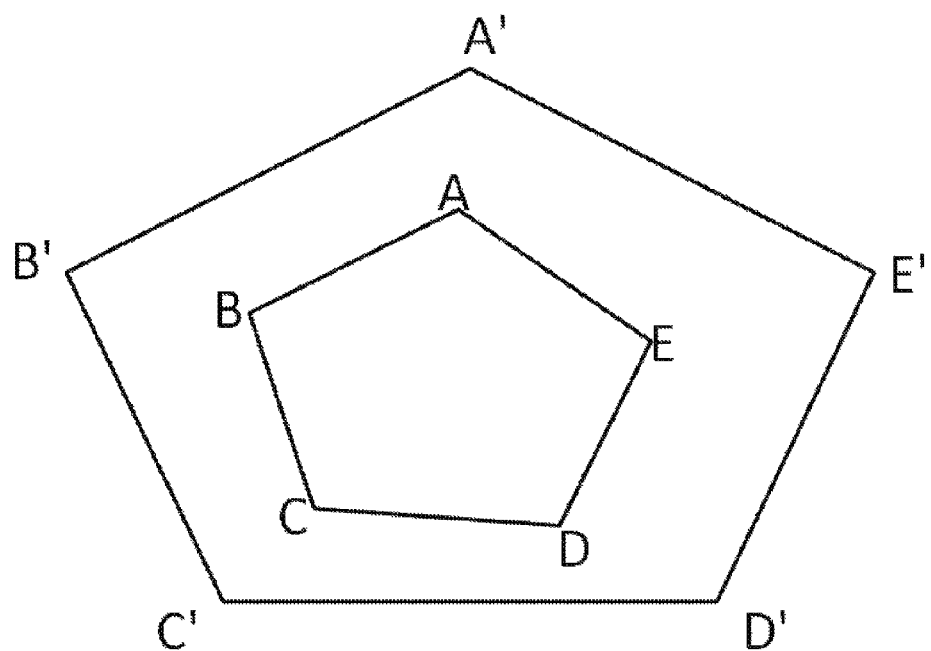
FIG. 5 is a schematic diagram showing the positioning of a pentagonal receiver array according to the invention.

The high-precision real-time satellite positioning method using a pentagonal array (the schematic diagram thereof is shown in FIG. 5), a hexagonal array or any other polygonal arrays is similar to the high-precision real-time satellite positioning method by using a quadrangular array, and thus it is not repeated herein.

It is to be understood that embodiments described in the present invention are illustrative but not restrictive. Thus, the present invention is not limited to the embodiments described in the detailed description. Any other embodiments such as a receiver array of other geometry obtained by those skilled in the art according to the technical solution of the present invention shall also be within the protection scope of the present invention.

What is claimed is:

1. A method for satellite positioning, comprising:
    obtaining, by each of a plurality of satellite positioning receivers, an observed coordinate value, wherein the plurality of satellite receivers comprises at least three satellite positioning receivers;
    calculating, by a processor, (i) a physical geometry of the plurality of satellite positioning receivers based on a physical geometric parameter of each of the plurality of satellite positioning receivers, and (ii) an observed value geometry of the plurality of satellite positioning receivers based on the observed coordinate value of each of the plurality of satellite positioning receivers;

determining, by the processor, a deviation vector based on comparison of the physical geometry and the observed value geometry of the plurality of satellite positioning receivers; and providing, by the processor, a coordinate of the plurality of satellite positioning receivers by subtracting the deviation vector from an observed value of a phase center of the plurality of satellite positioning receivers to correct the observed value of the phase center.

2. The method of claim 1, further comprising arranging the plurality of satellite positioning receivers at each vertex and within a polygon.

3. The method of claim 2, wherein the polygon includes a triangle, a quadrangle, a pentagon, or a hexagon.

4. The method of claim 1, wherein obtaining the observed coordinate value comprises:

receiving, by each of a plurality of satellite positioning receivers, original satellite positioning data independently at a same rate;

calculating, by each of a plurality of satellite positioning receivers, a phase center coordinate of the respective satellite positioning receiver based on the original satellite positioning data; and generating, by each of a plurality of satellite positioning receivers, an ID of the respective satellite positioning receiver.

5. The method of claim 4, wherein the plurality of satellite positioning receivers are synchronized in receiving the original satellite positioning data.

6. The method of claim 1, wherein vertexes of the physical geometry are antenna phase centers of the plurality of satellite positioning receivers.

7. The method of claim 1, wherein vertexes of the observed value geometry are defined based on the observed coordinate values of the plurality of satellite positioning receivers.

8. The method of claim 1, wherein determining the deviation vector comprises:

calculating a vector of relative positions among the observed coordinate values of the plurality of satellite positioning receivers; and calculating the deviation vector based on a difference between the calculated vector and a known vector of relative positions among the plurality of satellite positioning receivers.

9. The method of claim 8, wherein calculating the deviation vector comprises:

comparing a length of a side of the observed coordinate geometry and a length of a corresponding side of the physical geometry; and comparing an included angle between two sides of the observed coordinate geometry and an included angle between corresponding two sides of the physical geometry.

10. A system for satellite positioning, comprising:

a plurality of satellite positioning receivers arranged at each vertex and within a polygon and each configured to obtain an observed coordinate value, wherein the plurality of satellite receivers comprises at least three satellite positioning receivers; and a processor connected to the plurality of satellite positioning receivers and configured to:

calculate (i) a physical geometry of the plurality of satellite positioning receivers based on a physical geometric parameter of each of the plurality of satellite positioning receivers, and (ii) an observed value geometry of the plurality of satellite positioning receivers based on the observed coordinate value of each of the plurality of satellite positioning receivers;

determine a deviation vector based on comparison of the physical geometry and the observed value geometry of the plurality of satellite positioning receivers; and provide a coordinate of the plurality of satellite positioning receivers by subtracting the deviation vector from an observed value of a phase center of the plurality of satellite positioning receivers to correct the observed value of the phase center.

11. The system of claim 10, wherein the polygon includes a triangle, a quadrangle, a pentagon, or a hexagon.

12. The system of claim 10, wherein each of the plurality of satellite positioning receivers comprises:

a receiver configured to receive original satellite positioning data independently at a same rate; and a microcontroller unit (MCU) connected to the receiver and configured to:

calculate a phase center coordinate of the respective satellite positioning receiver based on the original satellite positioning data; and generate an ID of the respective satellite positioning receiver.

13. The system of claim 12, wherein the MCUs of the plurality of satellite positioning receivers are connected in parallel to the processor.

14. The system of claim 12, wherein the processor is further configured to synchronize the plurality of satellite positioning receivers in receiving the original satellite positioning data.

15. The system of claim 11, wherein vertexes of the physical geometry are antenna phase centers of the plurality of satellite positioning receivers.

16. The system of claim 11, wherein vertexes of the observed value geometry are defined based on the observed coordinate values of the plurality of satellite positioning receivers.

17. The system of claim 11, wherein the processor is further configured to:

calculate a vector of relative positions among the observed coordinate values of the plurality of satellite positioning receivers; and calculate the deviation vector based on a difference between the calculated vector and a known vector of relative positions among the plurality of satellite positioning receivers.

18. The system of claim 17, wherein to calculate the deviation vector, the processor is further configured to:

compare a length of a side of the observed coordinate geometry and a length of a corresponding side of the physical geometry; and compare an included angle between two sides of the observed coordinate geometry and an included angle between corresponding two sides of the physical geometry.

* * * * *